Nov. 3, 1959    J. S. WENZEL, JR., ET AL    2,911,082
PEAR FEEDING AND ORIENTING APPARATUS
Filed Aug. 30, 1957    2 Sheets-Sheet 1
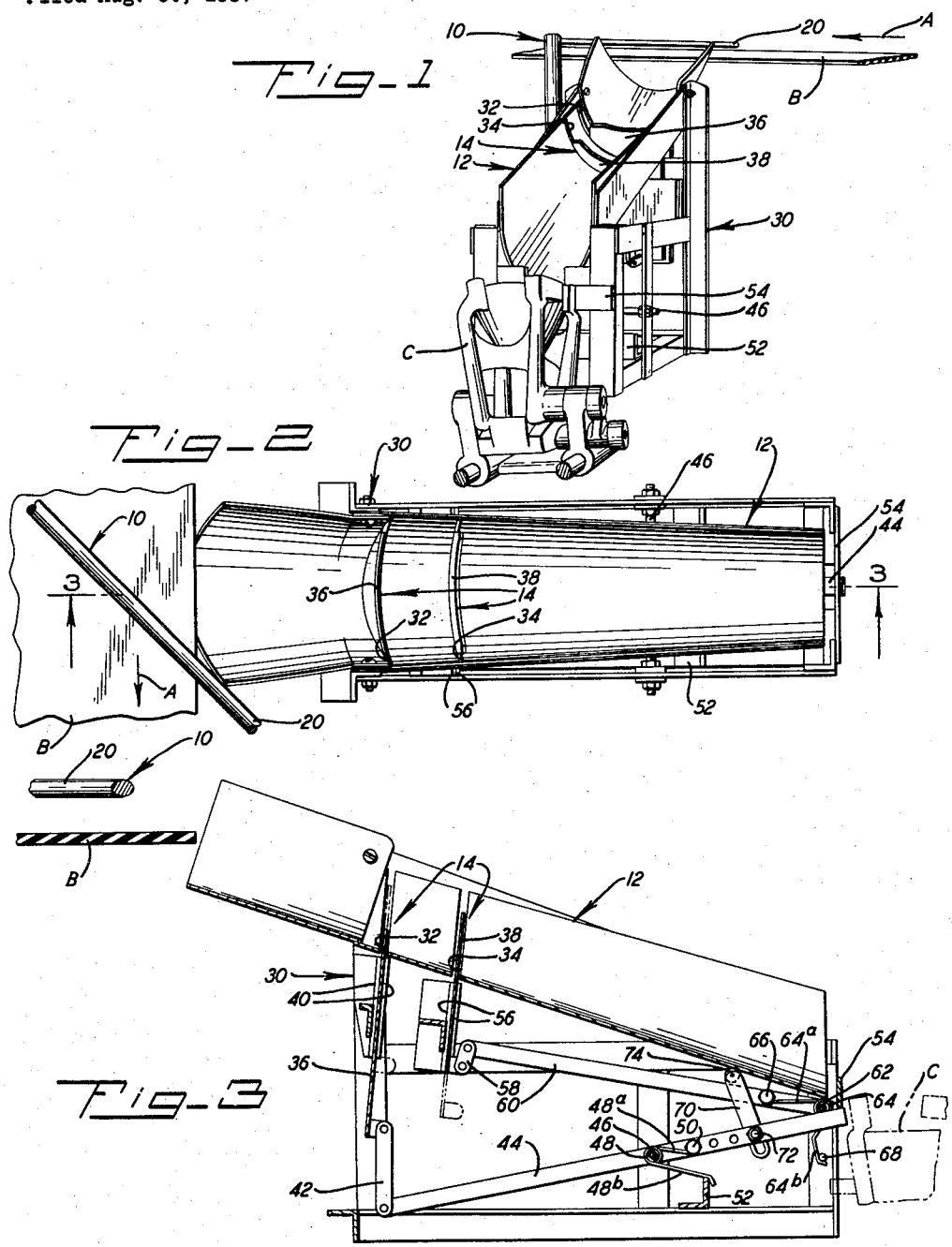
INVENTORS.
JOHN S. WENZEL, JR.
HUGH SCHADE
BY
PATENT AGENT

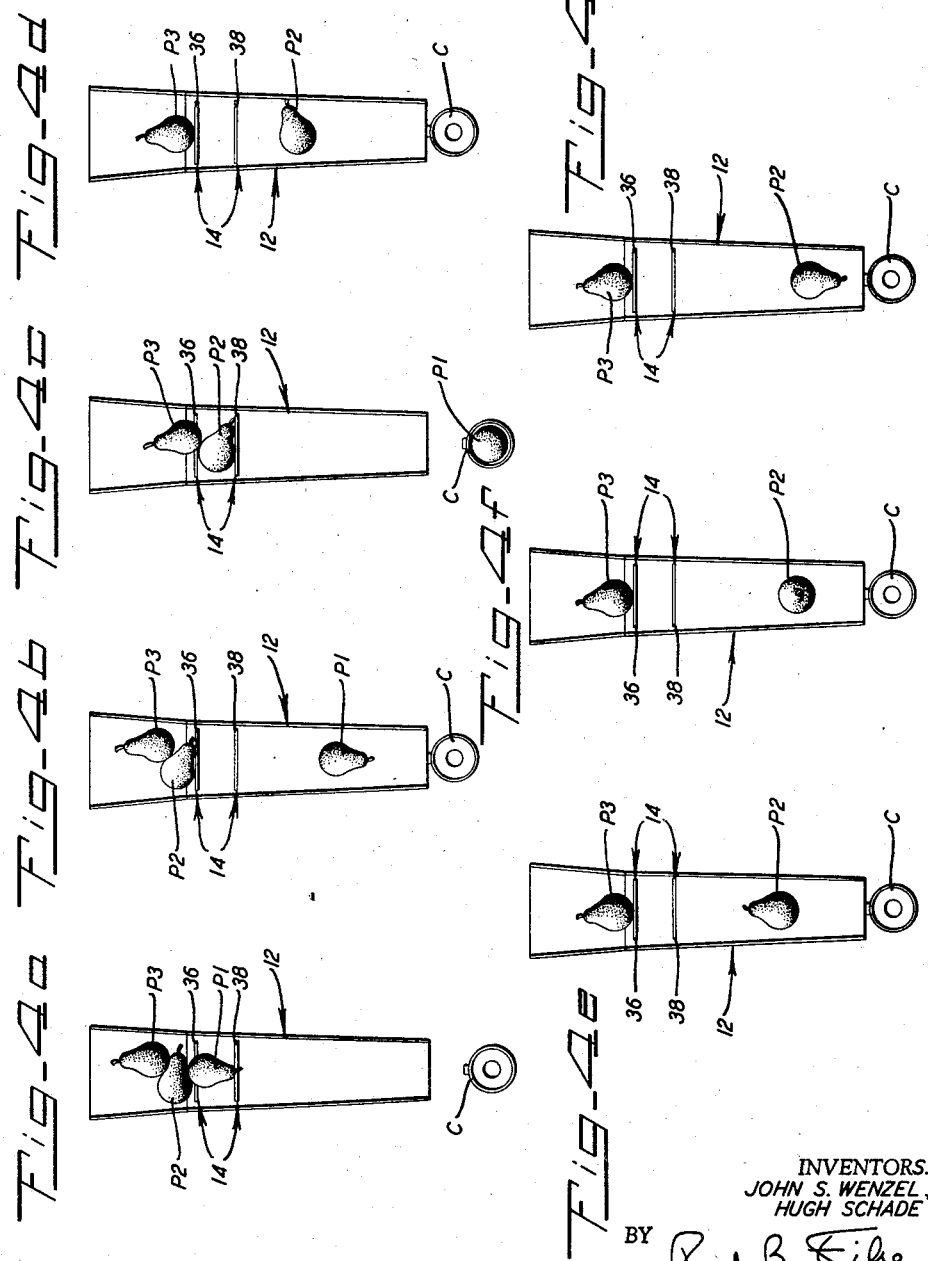

United States Patent Office 2,911,082
Patented Nov. 3, 1959

2,911,082

PEAR FEEDING AND ORIENTING APPARATUS

John S. Wenzel, Jr., Santa Clara, and Hugh Schade, Campbell, Calif.

Application August 30, 1957, Serial No. 681,375

10 Claims. (Cl. 193—43)

The present invention relates generally to apparatus for handling and processing fruit and vegetables, and more particularly, to apparatus for feeding and orienting pears.

While a considerable number of manufacturers supply machines that are adapted to peel, core, slice and otherwise process pears in an entirely automatic fashion, there has remained the necessity for utilization of an attendant or operator to feed the fruit to such machines. More particularly, in most instances, an operator stands adjacent the pear-processing machine, picks individual pears from a continuously moving conveyor belt and places such pears in cups or other receptacles whereupon the automatic processing operation is instigated. Such automatic pear machines operate at processing speeds as high as 48 pears per minute which taxes the mental and physical resources of any operator, particularly, if the processing continues over an extended period of time. The tedium of feeding the pears to such a machine over a protracted period of time results in carelessness that substantially decreases the efficiency of the processing operation, and moreover, in some instances, may result in physical injury to the operator.

Accordingly, it is a general object of the present invention to provide apparatus arranged to remove pears from a source of supply and thereafter feed those pears individually to a pear-processing machine of the general type mentioned above, and additionally, arranged to orient each pear during such feeding thereof.

More particularly, it is a feature of the invention to provide a feed chute for pears arranged to convey the same for discharge into the pear-receiving receptacle of a pear machine, such chute being formed to automatically orient the pears during the conveyance.

A further feature relates to the provision of means for controlling the movement of pears through such feed chute whereby a single pear is delivered to the pear machine, not only in properly oriented disposition but at the proper time.

Yet an additional feature relates to structure for diverting pears from a moving conveyor belt so that a continuous supply is made available for subsequent conveyance through the aforementioned feed chute.

A further feature relating to the mentioned chute itself is the simplicity of its design yet its effectiveness in operation so that pears supplied thereto, regardless of their initial disposition, will be properly oriented when discharged therefrom; and furthermore will not become jammed during conveyance through the chute.

Yet another feature relating to the control of the movement of pears through the chute is the precise gate arrangement utilized for this purpose which is simple in its structure and can be readily arranged for actuation in conjunction with a pear-processing machine.

These and other objects and features of the invention will become more apparent from a perusal of the following description of the structure shown in the accompanying drawings, wherein:

Fig. 1 is a perspective view of a pear feeding and orienting apparatus embodying the present invention and illustrated in association with a cup-type receptacle as employed in commercially-available pear machines, Fig. 2 is a top plan view of the apparatus, Fig. 3 is a sectional view thereof, taken along line 3—3 of Fig. 2, and Figs. 4a–g are a series of diagrammatic top plan views illustrating successive stages of pear movement through the apparatus of Figs. 1, 2 and 3.

As shown in Figs. 1, 2, and 3, the pear feeding and orienting apparatus embodying the present invention includes a diverting structure, generally indicated at 10, arranged to engage pears promiscuously placed and carried by a conveyor belt B so as to displace the same laterally of the belt into the entrance end of a feed chute 12 wherein an individual pear can be released by a gate mechanism 14 for simultaneous orienting and feeding thereof for ultimate discharge from the exit end of the feed chute into a cup C such as found on conventional pear-processing machines.

More particularly, the pear-diverting structure 10 can, as shown in the drawings, simply consist of a rigid arm 20 secured at one end to the side of the feed chute 12 so as to project partially across the belt B at a level so as to centrally engage pears carried thereon, and to the direction of movement of the conveyor belt, as indicated by the arrow A in Fig. 2. Thus, pears moving against such arm 20 will be deflected laterally from the belt B and into the mentioned feed chute 12.

Such feed chute 12 is generally U-shaped in cross section so as to form a trough-like structure for guided movement of the pears longitudinally thereof. The chute 12 can be formed by a substantially continuous piece of sheet metal pressed into the described U-shaped trough-like conformation, and is supported by a suitable framework, generally indicated at 30, on a table or other supporting structure (not shown) so as to decline longitudinally from its entrance end, disposed substantially at the level of the conveyor belt B, downwardly at a predetermined angle. Preferably, the chute 12 longitudinally converges from its entrance to its exit end, as best shown in Fig. 2.

Adjacent its entrance end, the chute 12 is provided in its bottom portion with two transversely-extending slots 32, 34 which are parallel and are spaced longitudinally of the chute a distance such that substantially only a single pear can be accommodated therebetween. These slots 32, 34 accommodate a pair of similar gates 36, 38 which can move upwardly or downwardly therethrough into or out of the path of the pears in the chute 12, such gates constituting elements of the aforementioned gate mechanism 14 for control of movement of pears through the chute. More particularly, and as best shown in Fig. 3, the first gate 36, which lies nearest the entrance end of the chute 12, is slidably supported for substantially vertical movement between guide plates 40 and is connected pivotally by a link 42 to the free end of a lever arm 44 that is, itself, centrally pivoted for movement in substantially a vertical plane on a transverse bar 46 forming part of the supporting framework 30 of the device. Adjacent the lever arm 44, a torsion spring 48 is coiled on such transverse bar 46 with its free projecting ends 48a, 48b, engaging, respectively, a laterally disposed pin 50 on the lever arm 44 and an element 52 of the supporting framework 30 so as to urge the lever arm in a counterclockwise direction about its pivot, as viewed in Fig. 3, wherefore the first gate 36 is normally disposed in a position withdrawn from the path of the pears in the chute 12, as shown in full lines. In order to bring the first gate 36 from the described withdrawn, inoperative position upwardly into an operative pear-blocking position, an actuating bar 54 is mounted for sliding movement substantially vertically adjacent the exit end of the chute 12, and is adapted upon downward motion to engage the end of the lever arm 44 remote from the first gate 36 so as to urge the lever arm about its pivot in a clockwise direction thereby bringing the first gate upwardly into pear-blocking position, as indicated by phantom lines in Fig. 3. Movement of the bar 64 is, of course, actuated in timed relation to operation of the pear processing machine, itself; and may take the simple form of engagement of the cup C, with the actuating bar so as to move the same downwardly when the cup C moves into pear-receiving position at the exit end of the chute.

The second gate 38 is mounted similarly to the first gate for sliding movement through the other slot 34 in the feed chute 12 and between guide plates 56 supported on the framework 30, and is connected at its lower end by a pivoted link 58 to the free end of a second lever arm 60. At its end remote from the gate 38, this lever arm 60 is pivotally secured on a transversely-extending bar 62 positioned closely adjacent the exit end of the chute 12 immediately thereunder and is normally urged into pear-blocking position by a torsion spring 64 mounted on such bar 62 with one free projecting end 64a thereof engaging a pin 66 on the lever arm 60 and the other projecting end 64b of such torsion spring 64 engaging a fixed bar 68 on the supporting framework 30. Projection of the gate 38 into pear-blocking position in the chute 12 is limited by engagement of the pivoted link 58 with the lower end of the guide plates 56.

This second gate 38 is actuated, that is, is brought from its normal position in pear-blocking position, as shown in full lines in Fig. 3, to a withdrawn pear-releasing position, as indicated in phantom lines in such figure, by means carried on the lever arm 44 mounting the first gate 36. As shown in Fig. 3, a rigid strap 70, slotted at its one end is adjustably secured by a suitable nut and bolt as indicated at 72 to the first lever arm 44 so as to project upwardly therefrom adjacent the second lever arm 60. At its upper end, this rigid strap 70 carries a roller 74 that is adapted upon operative movement of the first lever arm 44 to engage the upper surface of the second lever arm 60 to move the same downwardly, and effect the desired withdrawal of the second gate 38 from its pear-blocking position. More particularly, it will be noted that this roller 74 is normally disposed slightly above the second lever arm 60 so that it engages the same only after predetermined movement of the first gate 36 has already been experienced. By means of its slotted connection with the first lever arm 44, the strap 70 is adjusted so that the first lever arm 44 and the gate 36 carried thereby is moved into pear-blocking position before the roller 74 engages the second lever arm 60 to withdraw the second gate 38 from pear-blocking position. Since only a single pear can be disposed between the two gates 36 and 38, as previously mentioned, it will be seen that only that single pear will be freed by the withdrawal of the second gate 38 to complete its transit of the chute 12.

If it is assumed that the described pear feeding and orienting apparatus has been properly installed so that the entrance end of the chute 12 lies adjacent a conveyor belt B carrying a large number of promiscuously-disposed pears thereon, and with its exit end adjacent the cup or other receptacle C of a pear processing machine so that actuation of the described gates 36 and 38 in properly-timed relation is afforded, the operation of the apparatus will proceed substantially as follows. The pears, moving on the belt B and engaging the pear diverting arm 20 projecting partially thereacross, will be laterally displaced so as to fall from the edge of the belt B into the entrance end of the chute 12. As pears are moving continuously along the belt B, a considerable number will accumulate on the belt section encompassed by the diverting arm 20 and in the entrance end of the chute rearwardly of the second gate 38 disposed in its normal, upwardly projecting pear-blocking disposition, as shown in full lines in Fig. 3. After such supply has been established in the entrance end of the chute 12 and on that portion of the belt B encompassed by the diverting arm 20, other pears engaging those resting on that section of the belt will be deflected laterally so as to pass around the end of the diverting arm 20, and continue their travel on the conveyor belt B to another station—another pear feeding and orienting apparatus substantially the same as that herein described positioned for a similar feeding and orienting operation in connection with a second processing machine. It will be immediately obvious that as soon as pears are released by the described gate mechanism 14 so that the supply of pears in the entrance end of the chute 12 and on that portion of the belt B encompassed by the diverting arm 20 is depleted, additional pears moving along the belt B will come into such section to replenish the supply; wherefore a continuously available supply of pears is made available for the described apparatus and the pear processing machine fed thereby.

As previously mentioned, the pears in the entrance of the chute 12 are held against movement therealong by the closed second gate 38; and as a result of the spacing between the first and second gates 36 and 38, only a single pear can be entirely accommodated therebetween. The second pear in order in the chute 12 may project partially over the inoperatively disposed first gate 36, but is shoved backwardly therefrom upon rising of that gate so that upon subsequent lowering of the second gate 38, only a single pear will be freed for continued movement along the chute 12 and into the cup or other receptacle C of the pear processing machine.

The actual movement of the pear so released can best be described by reference to the diagrammatic views, Fig. 4a to 4g, to which reference is hereby made. With initial reference to Fig. 4a, there are shown in the chute 12 three pears P1, P2, and P3, for purposes of illustration, but it will, of course, be recognized that additional pears will rest in the chute rearwardly of those so illustrated. As shown in Fig. 4a, the first pear P1 is resting with its stem-blossom axis substantially longitudinally aligned with the chute 12 and with the stem end thereof in leading position and in engagement with the second gate 38. The second pear P2, on the other hand, lies with its stem-blossom axis disposed laterally of the longitudinal direction of the chute 12, and a third pear P3 rests behind the second pear P2 with its stem-blossom axis aligned longitudinally with the chute 12, but with the blossom end in leading disposition. A cup or other receptacle C, is shown moving toward pear receiving position at the exit end of the chute 12 to actuate the gate mechanism 14 and release the first pear P1 for movement along the chute 12 and ultimately into the cup C for subsequent movement through the pear-processing machine.

When such cup C reaches the exit end of the chute 12 so as to actuate the lever arms 44 and 60, the first gate 36 is initially raised so that the second pear and all those positioned in order therebehind will be blocked from movement. After such action has occurred, the second gate 38 is withdrawn from pear-blocking position so that the first pear P1 can move downwardly in the chute 12 toward the exit end thereof. Since the chute 12 is of arcuate cross section and the first pear P1 is disposed in a stable position with its stem end directed toward the exit end of the chute, and with its stem-blossom axis directed longitudinally of the chute, such movement of the pear P1 along the chute 12 will take the form of a direct sliding so that the pear retains the disposition shown in Fig. 4 throughout its entire traverse of the chute, an intermediate position in such traverse being illustrated in Fig. 4b. Such position is maintained because of the precise U-shape conformation of the chute 12 and the inherent shape characteristic of the pear so that this position is one of stability, there being no deflecting forces exerted on the pear sufficient to overcome the stabilizing forces and cause the pear to turn away from its aligned disposition during the traverse.

Ultimately, then, the pear P1 will drop from the exit end of the chute 12 stem end first into the cup C which is the desired position for subsequent transfer of the pear through the processing machine itself.

As movement of the cup C with the pear P1 therein away from the exit end of the chute 12 occurs, the gate mechanism 14 is, of course, released so that the gates 36 and 38 may reassume their normal inoperative positions with the second gate 38 rising into pear-blocking position and the first gate 36 thereafter dropping to its pear-releasing position. Such movement of the gates then effects the release of the second pear P2 for movement into position adjacent the second gate, as shown in Fig. 4c with its stem-blossom axis directed laterally of the chute and with the third pear P3 positioned with its blossom end slightly over the first gate, as clearly illustrated in Fig. 4c.

The second actuation cycle is instigated when another cup C moves into actuating position to release this second pear P2 through movement of the gates, as previously described. If this second pear P2 were so disposed that its stem end was directed almost downwardly along the length of the chute 12, it would, as a result of the curved conformation of the chute, merely shift slightly so that the position of stability whereat the stem end of the pear is directed precisely in the direction of the chute would be almost immediately assumed and the further movement of the pear would be substantially as described with respect to the first pear, as illustrated in Figs. 4a and 4b.

However, if the pear P2 is disposed with its stem blossom axis almost at right angles to the length of the chute 12, substantially as illustrated in Fig. 4c, a different action will occur as a result of the inherent shape characteristic of the fruit. Thus, when the cup C moves into position to release such transversely disposed pear P2, a rolling action will occur since the bulb portion of the pear is substantially spherical in shape and the stem end thereof is also substantially circular in cross section. The frictional retardation experienced by the pear P2 through its engagement with the surface of the chute 12 will permit such a rolling much more readily than a sliding of the fruit when in the described transverse, unstable disposition. As the pear starts to roll downwardly along the chute 12, two effects take place which tend to align the pear with its stem-blossom axis disposed longitudinally rather than transversely of the chute. First, since the diameter of the bulb portion of the pear is substantially greater than that of the stem end portion thereof, the rolling of the pear will cause the bulb portion thereof to advance more rapidly than the stem end portion thereof until ultimately such bulb portion comes to a leading disposition. At the same time, the stem end of the fruit will be brought into engagement with the upwardly-sloping side wall of the chute 12 so as to be somewhat frictionally restrained thereby at its end, such restraint also tending to shift the disposition of the pear P2 into a position of longitudinal alignment with the chute, but with the bulb portion in leading disposition. The partial turning of the pear into such aligned disposition is illustrated in Fig. 4d and the completion of the alignment is thereafter shown in Fig. 4e.

However, this aligned disposition is again one of instability since the bulb portion of the pear P2 is in leading position and such bulb portion is of substantially spherical shape so that a tendency results for a rolling rather than a sliding action along the chute 12. As a consequence, the pear P2 will overturn first to an upright position, as shown in Fig. 4f, and finally, into a completely overturned position with the stem-blossom axis aligned longitudinally with the chute 12 and the stem end thereof in leading disposition, as shown in Fig. 4g. Ultimate delivery of the second pear P2 into the cup C will finally, then, be accomplished stem-end first as was the case in connection with the first pear P1.

The third alternative need not be described in detail, but occurs when the pear P3 is positioned against the gate with its bulb portion in leading position and its stem blossom axis in alignment with the length of the chute as illustrated in Figs. 4d–g. From such a position, it will be obvious from what has been discussed immediately above that the pear P3 will turn over upon release by the gate 38 so that its stem end again comes into leading position with the stem-blossom axis of the fruit aligned with the length of the chute, and delivery into a cup will again be effected stem-end first.

It can be generally seen from the foregoing operational description that the generally U-shaped configuration of the chute 12 is such that a tendency exists for the fruit to engage the side walls thereof if laterally disposed so that a subsequent alignment of the fruit with its stem-blossom axis along the longitudinal direction of the chute will be obtained. Furthermore, because of the character of the surface of the chute 12 and the amount of inclination thereof, a frictional retardation is provided so that the fruit will turn unless it is disposed in a stable position with its stem end in leading disposition. The described longitudinal convergence of the chute towards its exit end has been found advantageous in securing the desired alignment and precise entry of the fruit into the receiving cup C, but it will be noted that the point of maximum convergence is at a position such that the pear has already become completely aligned and properly oriented while the upper end of the chute 12 is more open so that an unoriented pear cannot possibly become jammed therein. The generally smooth, curved conformation of the entire inner surface of the chute 12 and its open U-shaped cross section with an absence of restricting elements generally works to preclude any possibility of jamming during the transfer of the pears.

Various modifications and/or alterations can obviously be made without departing from the spirit of the invention, and the foregoing description of a preferred embodiment is to be considered purely as exemplary and not in a limiting sense; the actual scope of the invention being indicated by refernce to the appended claims.

What is claimed is:

1. In a pear feeding and orienting apparatus, a chute having a cross-section with a curved base portion whose radius of curvature is substantially larger than the radius of curvature of the bulb portion of the largest pear to be handled and with upwardly projecting side portions spaced apart a distance at least as great as the length of the largest pear to be handled, said chute being disposed longitudinally at a predetermined downward inclination and having a continuous, uninterrupted surface of a predetermined frictional coefficient such that a pear aligned lengthwise with said chute and with its stem end in leading disposition will slide along said chute but a pear with its blossom end in leading disposition will roll over into stem end-leading disposition, and means for feeding pears in spaced relationship through said chute.

2. In a pear feeding and orienting apparatus according to claim 1, said chute being shaped so that the side portions thereof converge in the direction of pear movement therethrough.

3. In a pear feeding and orienting apparatus according to claim 1, said pear feeding means including gate means for controlling the movement of pears through said chute.

4. In a pear feeding and orienting apparatus according to claim 3, said gate means including a pair of gates disposed for movement into and out of the path of the pears and spaced longitudinally of said chute whereby only a single pear can be accommodated therebetween.

5. In a pear feeding and orienting apparatus according to claim 4, means for actuating movement of said gates in a manner such that one gate is moved to an open position after the other gate is moved to a closed position.

6. In a pear feeding and orienting apparatus according to claim 4, means for supplying pears to the entrance end of said chute in a promiscuous mixture.

7. In a pear feeding and orienting apparatus according to claim 1, a conveyor belt adapted to conduct a plurality of pears continuously therealong and disposed adjacent the entrance end of said chute, and means projecting partially across said belt for diverting pears from said belt to the entrance end of said chute.

8. In a pear feeding and orienting apparatus according to claim 7, said pear diverting means including an arm supported to extend angularly and partially across said belt at a disposition slightly above the surface thereof and from a point adjacent the side of said chute so as to divert a predetermined portion of the pears on said belt into the entrance end of said chute.

9. In a pear feeding and orienting apparatus, a chute substantially U-shaped in cross-section with the curved base portion of the U having a radius of curvature substantially larger than the radius of the bulb portion of the largest pear to be handled and with the vertical sides of the U spaced apart a distance at least as great as the length of the largest pear to be handled, said chute being disposed longitudinally at a predetermined downward inclination and having a continuous, uninterrupted surface of predetermined frictional coefficient such that a pear aligned lengthwise with said chute and with its stem end in leading disposition will slide along said chute but a pear with its blossom end in leading disposition will roll over into stem-end leading disposition, and means for feeding pears in spaced relation through said chute.

10. In a pear feeding and orienting apparatus according to claim 9, a conveyor belt adapted to conduct a plurality of pears continuously therealong and disposed adjacent the entrance end of said chute, an arm supported to extend angularly and partially across said belt at a disposition slightly above the surface of the belt and to a point adjacent the side of said chute so as to divert a predetermined portion of the pears from said belt into the entrance end of said chute.

References Cited in the file of this patent

UNITED STATES PATENTS

| | | |
|---|---|---|
| 533,184 | Svenson | Jan. 29, 1895 |
| 877,141 | Thompson | Jan. 21, 1908 |
| 1,208,848 | Small | Dec. 19, 1916 |
| 1,793,752 | Schuler | Feb. 24, 1931 |
| 2,603,331 | Coons | July 15, 1952 |
| 2,632,552 | Coons | Mar. 24, 1953 |
| 2,791,314 | Meier | May 7, 1957 |
| 2,868,245 | Ernst | Jan. 13, 1959 |